July 29, 1941.  R. THOMAS  2,251,177
OPTICAL SYSTEM FOR PHOTOGRAPHY AND PROJECTION
Filed July 25, 1939  3 Sheets-Sheet 1
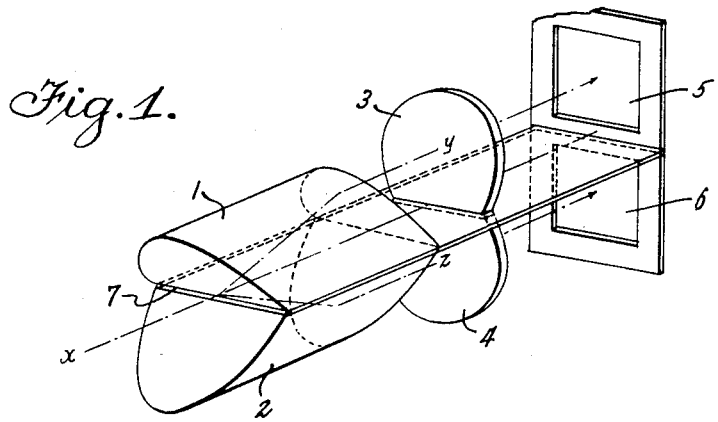
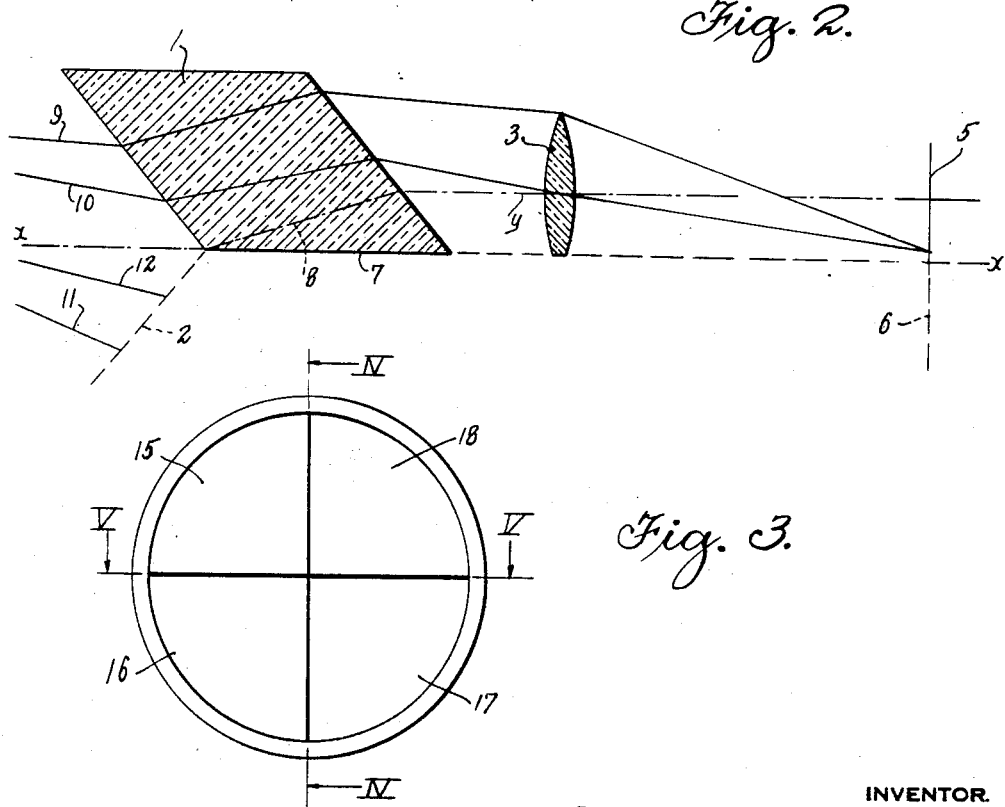
INVENTOR.
Richard Thomas
BY Lyon & Lyon
ATTORNEYS July 29, 1941.   R. THOMAS   2,251,177
OPTICAL SYSTEM FOR PHOTOGRAPHY AND PROJECTION
Filed July 25, 1939   3 Sheets-Sheet 2
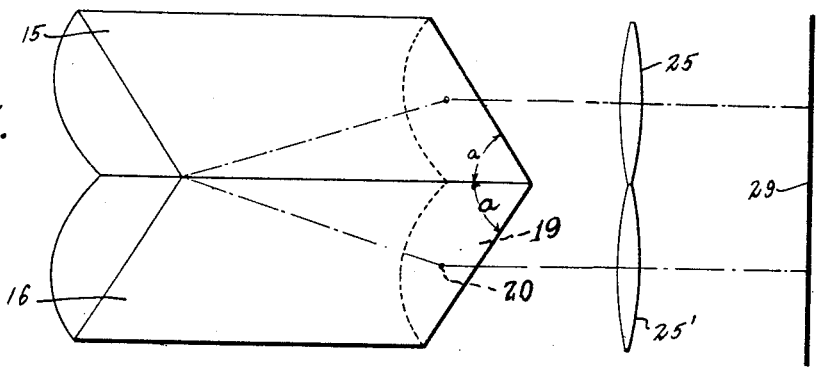
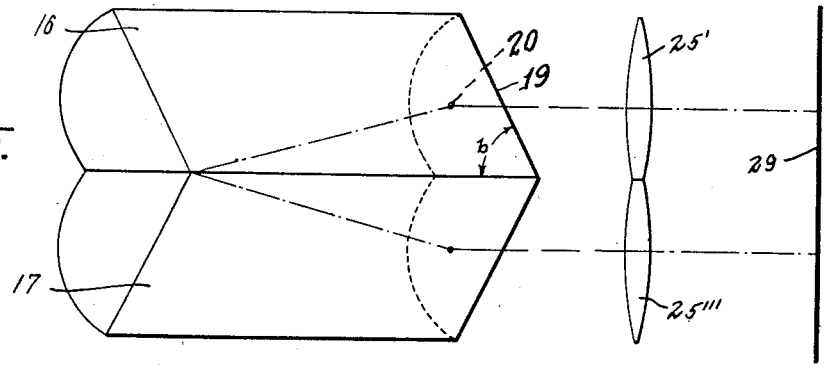
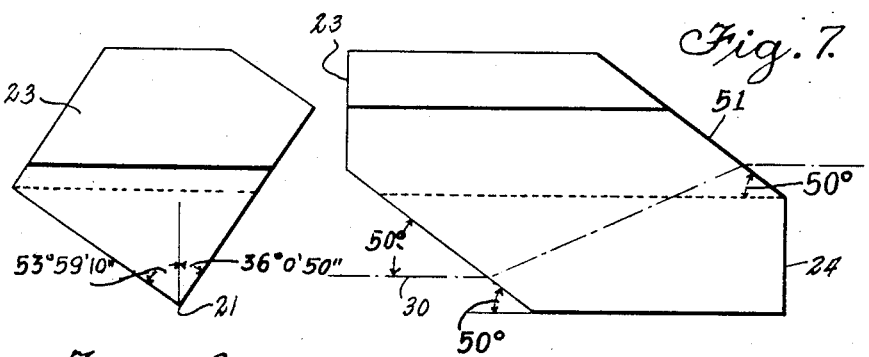
INVENTOR.
Richard Thomas
BY Lyon & Lyon
ATTORNEYS July 29, 1941.                  R. THOMAS                  2,251,177
              OPTICAL SYSTEM FOR PHOTOGRAPHY AND PROJECTION
                    Filed July 25, 1939              3 Sheets-Sheet 3

Inventor
Richard Thomas
By Lyon & Lyon
Attorneys

Patented July 29, 1941

2,251,177

UNITED STATES PATENT OFFICE 2,251,177

OPTICAL SYSTEM FOR PHOTOGRAPHY AND PROJECTION

Richard Thomas, Los Angeles, Calif., assignor to Thomascolor Corporation, a corporation of Nevada Application July 25, 1939, Serial No. 286,369

6 Claims. (Cl. 88—16.6)

This invention relates to means and methods whereby correlation of a single objective field with a plurality of image fields can be readily attained. Expressed differently, the invention relates to means and methods whereby a plurality of isomorphous images may be simultaneously obtained of a single object field without introducing parallax or amplifying errors of spherical aberration.

The invention is particularly directed to photographic apparatus such as motion picture cameras, projectors and the like, adapted to record or project a plurality of images of different color value simultaneously whereby pleasing color reproduction of the object or object field may be attained. The isomorphous negatives obtained by the optical means of this invention may also be employed in lithography and in various other processes for reproduction of photographs in colors, such as, for example, the imbibition process, transfer, dye-toning and the like.

Although numerous means have been suggested in the past for the attainment of isomorphous images, careful studies have demonstrated the ineffectiveness, and in some cases inoperativeness, of such prior means. In motion picture photography it is not possible to employ a complicated optical system which has high light absorptive capacity since the photography must be carried out under normal lighting conditions with great rapidity. Moreover, whenever prisms or lens elements are added to the normal objective, the characteristics of the objective are varied and the minor errors of spherical aberration, coma, etc., are accentuated to such degree that the resulting images lose definition and brilliance, obviating their use in the production of motion pictures. The present invention relates to a relatively simple optical system which is free from the objections to which the prior combinations are subject.

An object of this invention, therefore, is to disclose and provide an optical system whereby correct correlation of a single objective field with a plurality of image fields can be attained.

A further object is to disclose and provide means whereby a plurality of isomorphous images may be simultaneously obtained.

A further object is to disclose and provide means whereby a plurality of isomorphous images in spaced relation may be attained from a common point of view.

An object of the invention is to disclose and provide an optical system of high efficiency, low light absorption and free from diffusion or error whereby a plurality of isomorphous images may be simultaneously obtained.

These and other objects, uses and advantages of the invention will become apparent to those skilled in the art from the following detailed description of illustrative forms of the invention, reference being had to the appended drawings, in which:

Fig. 1 is a perspective view, partly broken away, illustrating an arrangement of elements capable of being employed in the projection of two isomorphous images at the same time.

Fig. 2 is a diagrammatic representation of a longitudinal section of the arrangement shown in Fig. 1.

Fig. 3 is a front elevation of an optical system adapted to reproduce four isomorphous images.

Fig. 4 is a vertical longitudinal section through the arrangement shown in Fig. 3.

Fig. 5 is a horizontal longitudinal section through the arrangement shown in Fig. 3.

Figs. 6 and 7 are front and side elevations, respectively, of a modified form of deflecting member adapted to be employed in an optical system designed for correlation of four image areas to an objective field.

Figure 9:
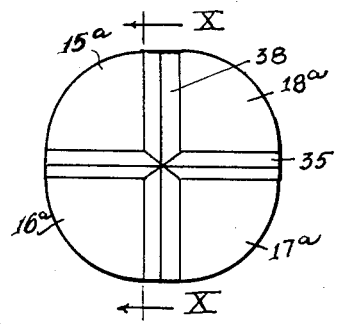
Fig. 9 is a front elevation view of the optical system of Fig. 8.

Generally stated, the optical system of the invention includes a deflecting member provided with parallel plane front and rear surfaces positioned between a lens and an objective field, the optical axis of the lens being displaced with respect to the central axis or a longitudinal edge of the deflecting member.

As shown in Fig. 1, for example, two deflecting members, generally indicated at 1 and 2, are positioned immediately in front of the lenses 3 and 4 which are focused upon the separated image areas 5 and 6 lying in the same vertical plane. The deflecting members 1 and 2 are positioned on opposite sides of a thin septum 7. The central axis is indicated at $x$—$x$ and lies in the septum 7. The optical axes of the lenses 3 and 4 are indicated at $y$ and $z$ respectively but it is to be seen that the optical axes $y$ and $z$ are parallel to but spaced from the central axis $x$—$x$.

The deflecting member 1 is provided with plane parallel front and rear surfaces which causes light entering the front surface to be deflected upwardly and emitted from the rear surface in a displaced or translated position. This emitted light is then focused by the lens 3 upon the image area 5. The lower deflecting member 2 is provided with plane and parallel front and rear surfaces which are equally but oppositely inclined to the faces of the member 1, causing the light to be downwardly deflected. Such downwardly deflected light is then focused by the lens 4 upon the image area 6.

In actual operation, the deflecting members 1 and 2 as well as the lenses 3 and 4 are held within a single housing which permits focusing of the lenses in a normal manner. The lenses 3 and 4 are preferably in very close proximity to the rear of the deflecting members 1 and 2 and movable therewith. Structural details of the housing are not shown since their construction and adaptation to normal photographic equipment comes within the skill of those working in the art. The septum 7, which may be specially treated to prevent reflections, separates the members 1 and 2 and the lenses 3 and 4 and extends to the image plane.

By referring to Fig. 2, it will be seen that the optical axis $y$ of the lens 3 (here shown as a single lens equivalent of a compound objective) is spaced from the septum 7 through which the central axis $x$—$x$ passes. The vertical displacement of the axis $y$ with respect to the central axis $x$—$x$ is equivalent to the amount of deflection imparted to a ray parallel to the axis $x$—$x$ by the deflecting member 1. The path of a ray from infinity entering the member 1 immediately above the septum 7 is indicated at 8 and it will be seen that this ray, when emitted by the member 1, passes directly through the optical axis of the lens 3. The path of two rays 9 and 10 from a point in the object field to a corresponding point in the image area 5 is also shown. The rays 11 and 12 also emanating from such point in the object field but passing through the lower deflecting member 2 and the lens 4 will form a corresponding point on the image area 6.

From an examination of Fig. 2 it will be evident that the lenses 3 and 4 may have their optical axes spaced apart a very considerable distance without producing images on the areas 5 and 6 which do not contain the same object or objects in corresponding portions of the spaced image areas. In other words, it is now possible to employ two or more lenses, each directed upon a separate image area, and obtain isomorphous images which do not exhibit the differences which are normally obtained from two or more separate points of view. In other words, even though the lenses 3 and 4 have their optical axes separated, the images will not show parallax. Furthermore, by employing lenses such as 3 and 4, the most effective central portions of these lenses are employed to full advantage. Higher photographic speed is thus attained without introduction of errors due to spherical aberration. The deflecting members 1 and 2 do not cause prismatic separation of shorter and longer wave lengths. As a result, the characteristics of the lenses 3 and 4 are not varied. The deflecting members absorb but a very small percentage of the total light received by them since only two air-glass surfaces are introduced.

It will be obvious to those skilled in the art that the length of the members 1 and 2 can be varied with size of lenses used, index of refraction of the glass, etc. Moreover, the exterior contour of the members 1 and 2 may also be varied. They may be either in the form of parallelepipedons or provided with one plane side adapted to contact the septum 7, and a substantially cylindrical exterior.

In simultaneous formation of four isomorphous images, devices of the character illustrated in Figs. 3, 4 and 5 may be employed. Thus, four closely adjacent deflecting members 15, 16, 17 and 18 may be employed in front of four lenses, each adapted to receive light from one of the deflecting members. Each of the members is provided with plane and parallel front and rear faces which are inclined both vertically and horizontally. As shown in Fig. 4, for example, the rear face 19 of member 16 is forwardly and upwardly inclined, its angle with the horizontal measured in a longitudinal vertical plane being indicated at $a$. In Fig. 5, however, it is seen that the front face 19 is also inclined in a horizontal plane by an angle $b$. As a result, a ray from infinity entering the member 16 at a point immediately adjacent the central axis (where the various members 15 to 18 come together) will be deflected downwardly and horizontally to an extent determined by the angles $a$ and $b$, such ray being emitted in a direction parallel to the central axis at a point indicated at 20. The location of the point 20 should then coincide with the optical axis of the lens 25' which then projects the image onto the image plane 29.

Each of the deflecting members 15, 17 and 18 similarly transmits light to its respective lens or lens segment, thereby permitting the production of four isomorphous images simultaneously in separate frames in the same plane. Since the normal motion picture image area is not square but instead is oblong, the angles $a$ and $b$ referred to hereinabove are not equal, a greater amount of horizontal displacement taking place than vertical displacement.

Figs. 6 and 7 illustrate specific details of a deflecting member capable of being used in place of the specific members 15, 18, 16, 17 shown in Figs. 3 to 5. As there shown, the front and rear faces 50 and 51, respectively, of the deflecting member are inclined at the same angles to the horizontal and vertical planes as are the front and rear faces of the elements 15, 16, 17 and 18. The deflecting member shown in Figs. 6 and 7 is shortened by cutting off the extreme ends to produce normal surfaces 23 and 24, since such surfaces are not in the path of useful light rays.

With the construction shown in Figs. 6 and 7, for standard motion picture work in which the vertical displacement between the frame centers is 0.748 inch and the horizontal displacement is 1.029 inches, the dimensions of the various angles will be as shown in Figs. 6 and 7 when employing a glass having an index of refraction of 1.5166 and a perpendicular spacing between front and rear faces of 2.237 inches.

Figure 8:
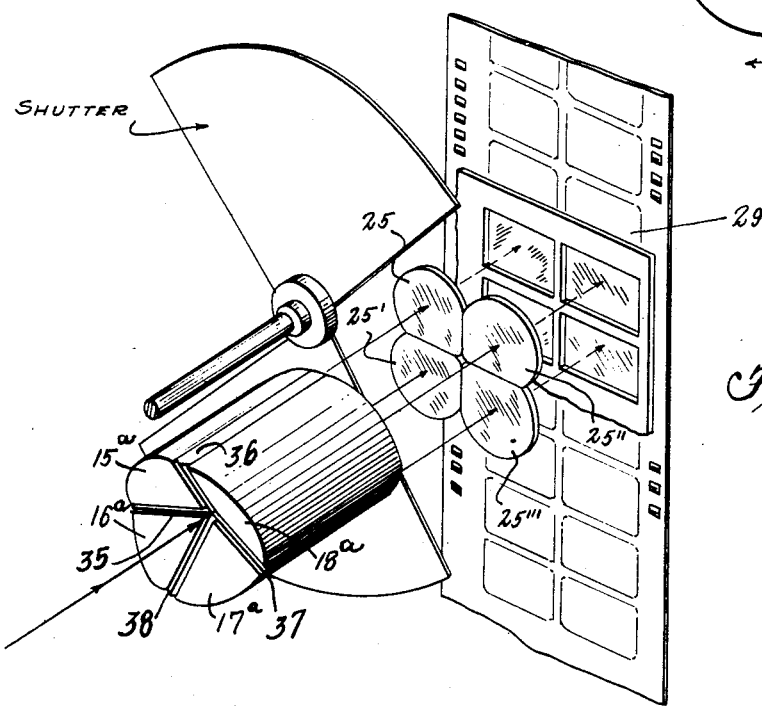
Fig. 8 is a perspective view showing a special modification of the invention adapted for four image work.

The perspective view of Fig. 8 discloses a system similar to that shown in Figs. 3, 4 and 5 and incorporating four segmental deflecting elements 15a, 16a, 17a and 18a, corresponding, respectively, to the segmental deflecting elements 15, 16, 17 and 18 in Figs. 3, 4 and 5. The front and rear faces of these elements 15a to 18a, inclusive, are parallel to each other and positioned at the same angles to the horizontal and vertical planes as shown in Figs. 4 and 5. The construction differs from that shown in Figs. 3, 4 and 5, in that the four elements 15a, 16a, 17a and 18a are spaced slightly apart and the spaces filled with four glass septums 35, 36, 37 and 38, respectively, each of these septums being bevelled and polished at its forward end to provide two light-receptive surfaces lying in the planes of the enclosing segments.

Figure 11:
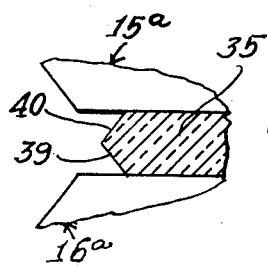
Fig. 11 is an enlarged detail section of a portion of the system taken in the same plane as Fig. 10.

Thus referring to Fig. 11, the septum 35 has one end surface 39 which is spaced from but lies in the same plane as the end of the deflecting segment 15a, and a second surface 40 which is spaced from but lies in the same plane as the front end of the deflecting element 16a. The faces of the septums 35, 36, 37 and 38 are polished and joined to the contacting surfaces of the deflecting elements with balsam so that there is no reflection or refraction of light at these lateral surfaces and the effect is the same as though the entire unit were formed from a single piece of glass.

Figure 10:
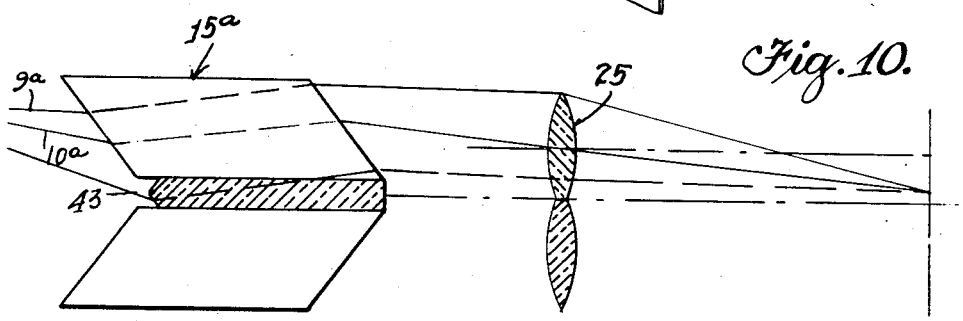
Fig. 10 is a longitudinal section taken substantially in the plane X—X of Fig. 9.

The optical effect of the septums is illustrated in Fig. 10, in which it will be observed that rays 9a, 10a, emanating from the same point in the objective field, correspond to the rays 9 and 10 in Fig. 2, and the new ray 43 impinging on the face 39 of the septum 35, also emanates from the same point in the objective field. This additional ray 43 is deflected upwardly so that it issues from the rear face of the segment 15a, passes through the lens 25, and is focused in the image plane at the same point as the rays 9a and 10a are focused. It will be observed that the use of the septums 35, 36, 37 and 38 increases the area over which incoming rays are deflected to each of the separate image areas.

Since none of the useful light leaves the rear edges of the septums 35, 36, 37 and 38, those edges need not be polished.

An advantage of the structure shown in Figs. 8 to 11, inclusive, is that the deflecting elements 15a to 18a, inclusive, can be made symmetrical and the additional divergence of the light horizontally obtained by making the vertical septums 36 and 38 thicker than the horizontal septums 35 and 37, as clearly shown in Fig. 9.

As previously explained, this increased divergence horizontally over that obtained vertically, is necessitated by the fact that the usual motion picture frame has a width greater than its height.

For motion picture work in which the vertical center-to-center spacing between frames is 0.748 inch and the horizontal center-to-center spacing between frames is 1.029 inches, the horizontal septums 35 and 37 may have a thickness not exceeding half the vertical center-to-center spacing or 0.379 inch and the vertical septums 36 and 38 may have a thickness not exceeding half the horizontal center-to-center spacing or 0.514 inch.

Another advantage of the structure shown in Fig. 10 is that light impinging on the front faces of the deflecting elements on all sides of the central axis is directed to each of the four lenses so that each lens sees the objective field from more nearly the same point.

Furthermore, whereas in the structure of Fig. 2 more useful light enters through the outer portions of the lenses than through the inner portions thereof, in the structure of Fig. 10 the useful light passing through each lens is more uniformly distributed over the entire lens. This further reduces parallax.

The inner edges of the four septums 35, 36, 37 and 38 are bevelled so that they fit snugly against each other with the bevelled edges of the four segments lying along the central axis of the unit.

Particular attention is called to the fact that in all instances the deflecting members are to be positioned between the objective field and the lens and not between the lens and the focal or image plane. Moreover, the deflecting members are to be positioned in close proximity to the front of the objective lens. It is to be understood that the invention is not limited to the specific embodiments described, but is adapted for use whenever a plurality of identical images are to be obtained. Obviously, two or more deflecting members may be grouped around a common axis to obtain this result. The lenses employed in connection with these deflecting members may have their outer surfaces cut away appropriately. Light-dividing partitions or septa may be used between the deflecting members and lenses and extend up to the image plane to prevent interference or overlapping of images on the image plane.

It is to be understood that in multicolor photography, suitable color filters will be introduced in the path of light rays passing through each of the deflecting members. When two identical images are to be obtained, as by means of the device shown in Figs. 1 and 2, only two color filters are employed, one being positioned in the path of the rays passing through lens 3 and another positioned in the path of the rays passing through the lens 4. Such color filters may be positioned between the lens and the image field or between the deflecting members and the lenses. In the event four color photography is to be employed by means of the device shown in Figs. 3, 4, 5 and 8, three or four appropriate color filters are disposed in a similar manner. The color filters have not been shown in the drawings since their introduction would be readily arranged by those skilled in the art. Similarly, apertures and shutters have not been shown in detail since their use is readily adaptable to a system of the character described.

I claim:

1. An optical system adapted to correlate a single objective field with two isomorphous image fields, comprising: a pair of deflecting members in adjoining relation along a longitudinal plane, each of said deflecting members being provided with plane and parallel front and rear surfaces, the front and rear surfaces of one member being equally but oppositely inclined to the surfaces of the other member and the angle between the front faces of the two members being less than 180°; and a pair of objective lenses between said deflecting members and the focal plane and in close proximity to said members, the optical axes of said lenses being parallel and spaced from the longitudinal plane of the two members a distance substantially equivalent to the deflection imparted to a ray parallel to the longitudinal plane by one of said members.

2. In an optical system including a plurality of objective lenses, the combination of a deflecting member positioned between each lens and the object field, said deflecting members being provided with plane and parallel front and rear surfaces and meeting each other along a longitudinal axis, the optical axis of each lens being parallel to the said longitudinal axis and spaced from such axis a distance substantially equivalent to the deflection imparted to a ray parallel to the said longitudinal axis of said member, in passing through said member, the angle between the front faces of said deflecting members being less than 180°.

3. In an optical system for simultaneously forming a plurality of isomorphous images of a single objective field, the combination of: a plurality of objective lenses grouped about a common axis; a deflecting member positioned between each lens and the objective field, each deflecting member being provided with plane and parallel front and rear surfaces, said front and rear surfaces lying in planes at an angle to both the horizontal and vertical planes passing through the common axis; the optical axis of each lens being parallel to the common axis but spaced therefrom a distance virtually equivalent to the deflection imparted by the deflecting member to a ray, parallel to the common axis, in passing through such member, the angle between the front faces of said deflecting members being less than 180°.

4. In an optical system for simultaneously forming a plurality of isomorphous images of a single objective field, the combination of: a plurality of objective lenses grouped about a common axis; a deflecting member positioned between each lens and the objective field, each deflecting member being provided with plane and parallel front and rear surfaces, said front and rear surfaces lying in planes at an angle to both the horizontal and vertical planes passing through the common axis, whereby a ray entering each of said deflecting members is deflected away from said common axis; the optical axis of each lens being parallel to the common axis but spaced therefrom a distance virtually equivalent to the deflection imparted by the deflecting member to a ray, parallel to the common axis, in passing through such member, the angle between the front faces of said deflecting members being less than 180°.

5. In an optical system for simultaneously forming a plurality of isomorphous images of a single objective field, the combination of: a plurality of objective lenses in adjacent relation with their optical axes parallel and directed upon the geometrical centers of separated image areas in an image plane; and a plurality of deflecting members between said objective lenses and the object field, said deflecting members being grouped about a common axis parallel to the optical axes of said lenses, each deflecting member being adapted to transmit light to only one of said lenses, each deflecting member having plane and parallel front and rear faces at an angle to said common axis, the length of said deflecting member and the angulation of said faces being sufficient to deflect a ray parallel to and close to the common axis upon the optical axis of its corresponding lens, the angle between the front faces of said deflecting members being less than 180°.

6. In an optical system including a plurality of objective lenses, a plurality of deflecting members, one positioned between each lens and the objective field, each deflecting member having plane and parallel front and rear surfaces, and each pair of adjacent deflecting members having spaced apart parallel polished surfaces, and a septum of the same material as said deflecting members positioned between said parallel polished surfaces and optically sealed therewith, said two adjacent deflecting members having their front surfaces inclined in opposite directions from a central longitudinal axis and the front edge of said septum being bevelled and having each bevelled face lying in the same plane as the front face of the deflecting member positioned on the opposite side thereof.

RICHARD THOMAS.